P. W. COFFMAN.
TIRE TOOL.
APPLICATION FILED OCT. 9, 1914.

1,220,956.

Patented Mar. 27, 1917.

Witnesses
Fredrick R. Moray
J. W. Garner

Inventor
P. W. Coffman,
By Victor J. Evans
Attorney

UNITED STATES PATENT OFFICE.

PARRETT W. COFFMAN, OF NEW SALEM, PENNSYLVANIA.

TIRE-TOOL.

1,220,956.                Specification of Letters Patent.         Patented Mar. 27, 1917.

Application filed October 9, 1914. Serial No. 865,912.

*To all whom it may concern:*

Be it known that I, PARRETT W. COFFMAN, a citizen of the United States of America, residing at New Salem, in the county of Fayette and State of Pennsylvania, have invented new and useful Improvements in Tire-Tools, of which the following is a specification.

This invention is an improved tire tool, which I call a tire jack, for use in putting on clencher tires, the object of the invention being to provide an improved tool of this character which is cheap and simple in construction, and efficient in operation.

The invention consists in the construction, combination and arrangement of devices hereinafter described and claimed.

In the accompanying drawings:—

Figure 1:
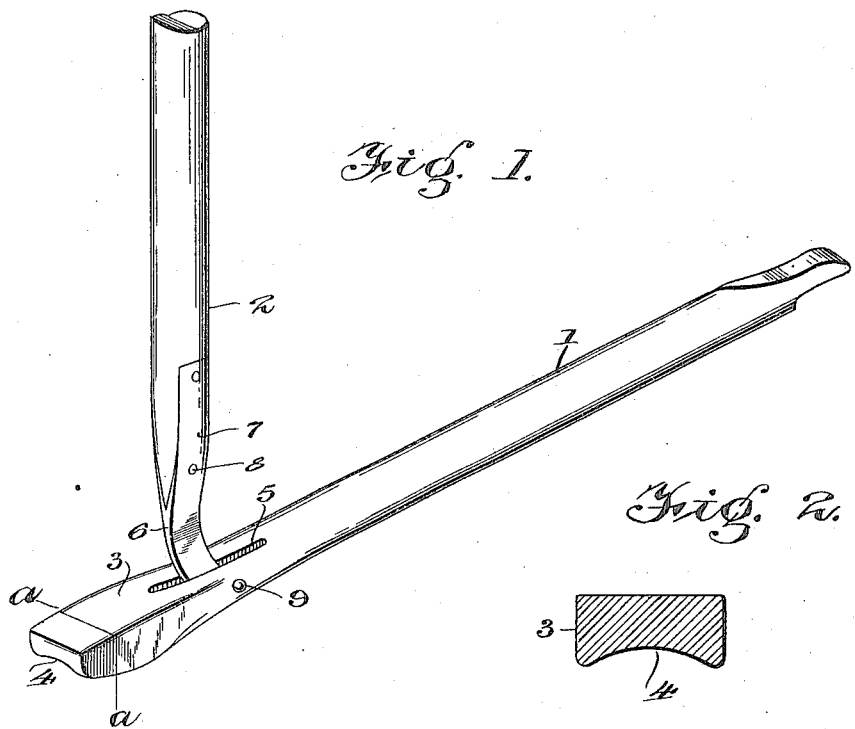
Figure 1 is a perspective view of a tire tool constructed in accordance with my invention, partly in section.
Figure 2:
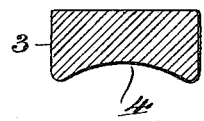
Fig. 2 is a detail transverse sectional view of the same on the plane indicated by the line *a—a* of Fig. 1.

My improved tire tool comprises essentially a main lever bar 1 and a movable bar 2. The lever bar 1 has a head 3 at one end which is inclined slightly to the axis of said lever bar and is provided on its outer side with a rocker face and also with a longitudinal, shallow groove or recess 4 which is concave, cross sectionally of the head, as shown in Fig. 2. The said lever bar is also provided on its outer side with a longitudinal groove or slot 5 which is spaced a suitable distance from the outer end of the head.

Figure 3:
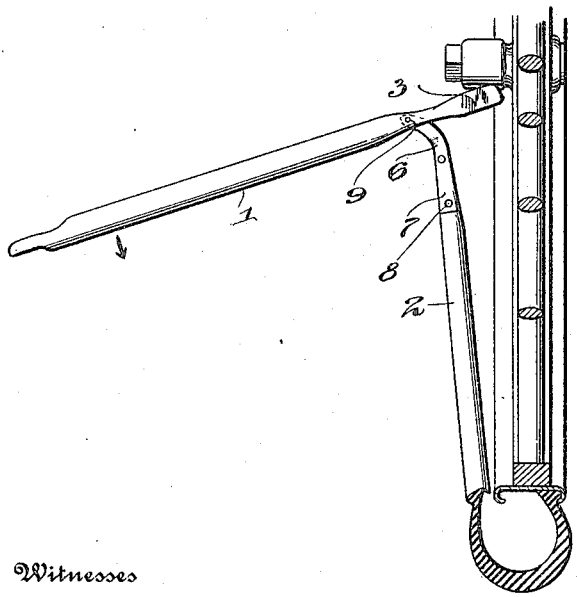
Fig. 3 is a transverse sectional view of a portion of an automobile rim and a clencher tire and showing my improved tire tool applied.

The member 2 is shorter than the member 1 and is provided at one end with a curved metallic arm 6 which has a bifurcation 7 in which the member 2 is secured as by means of rivets 8 and said curved arm has its outer end arranged in the slot 5 and pivotally mounted on a bolt 9 which passes transversely through said slot and the contiguous portions of the lever bar 1. When using the tool, as shown in Fig. 3, the rocker face of the head of the main lever bar is caused to bear against and its groove 4 to receive one side of the wheel hub. The free end of the member 2 is notched or shaped to enable it to engage one side of the tire and the said member 2 when the lever bar is operated serves to thrust the tire and facilitate its attachment to the rim.

Having thus described my invention, I claim:—

The herein described tire jack comprising a lever having a head at one end and also provided with a longitudinal slot near said head, said head being provided with a rocker face and a hub engaging recess in said rocker face; and a bar arranged on the side of the lever bar opposite the rocker face and having a bent inner end arranged in the slot of the lever; and a pivot extending through the lever and the bent end of the bar and permanently pivotally connecting the latter to the lever, the bent end of said bar adapting the same to be folded against the lever, the said bar being provided at its free end with a notch adapted to engage one side of the tire.

In testimony whereof I affix my signature in presence of two witnesses.

PARRETT W. COFFMAN.

Witnesses:
   CHARLES S. HEMPSTEAD,
   E. I. JEFFRIES.

Copies of this patent may be obtained for five cents each, by addressing the "Commissioner of Patents, Washington, D. C."